US011643548B2

(12) United States Patent
Lendlein et al.

(10) Patent No.: US 11,643,548 B2
(45) Date of Patent: May 9, 2023

(54) HIGHLY ELASTIC LACTIDE-BASED POLYMER BLEND, OBJECT MADE FROM THE POLYMER BLEND AND METHOD OF PRODUCING THE OBJECT

(71) Applicant: Helmholtz-Zentrum hereon GmbH, Geesthacht (DE)

(72) Inventors: Andreas Lendlein, Berlin (DE); Axel Thomas Neffe, Berlin (DE); Paul Jakob Hommes-Schattmann, Berlin (DE); Quanchao Zhang, Jiangxi (CN)

(73) Assignee: HELMHOLTZ-ZENTRUM HEREON GMBH, Geesthacht (DE)

( * ) Notice: Subject to any disclaimer, the term of this patent is extended or adjusted under 35 U.S.C. 154(b) by 549 days.

(21) Appl. No.: 16/623,266

(22) PCT Filed: Sep. 26, 2018

(86) PCT No.: PCT/EP2018/076136
§ 371 (c)(1),
(2) Date: Dec. 16, 2019

(87) PCT Pub. No.: WO2019/063619
PCT Pub. Date: Apr. 4, 2019

(65) Prior Publication Data
US 2020/0181396 A1    Jun. 11, 2020

(30) Foreign Application Priority Data

Sep. 28, 2017  (EP) .................................. 17193882

(51) Int. Cl.
*C08L 67/04*   (2006.01)
*D01D 5/00*   (2006.01)
*D01F 6/92*   (2006.01)

(52) U.S. Cl.
CPC ............ *C08L 67/04* (2013.01); *D01D 5/0007* (2013.01); *D01F 6/92* (2013.01); *C08L 2203/12* (2013.01); *C08L 2205/025* (2013.01)

(58) Field of Classification Search
CPC ................. C08L 67/04; C08L 2203/12; C08L 2205/025; D01D 5/0007; D01F 6/92
(Continued)

(56) References Cited

U.S. PATENT DOCUMENTS

2016/0130435 A1    5/2016  Hwang et al.
2017/0072089 A1*   3/2017  Nseir Manassa ....... A61L 27/50

FOREIGN PATENT DOCUMENTS

EP    2787040 A1    10/2014
JP    2008-115503 A   5/2008

OTHER PUBLICATIONS

European Search Report dated Mar. 6, 2018 in EP 17193882.
(Continued)

*Primary Examiner* — Ling Siu Choi
*Assistant Examiner* — Ronald Grinsted
(74) *Attorney, Agent, or Firm* — Fox Rothschild LLP

(57) ABSTRACT

A polymer blend is provided, comprising or consisting of: (A) a first polymer component, being a copolymer having a substantially random, partially blocky structure and selected from poly[(L-lactide)-co-(ε-caprolactone)] and poly[(D-lactide)-co-(ε-caprolactone)] and (B) a second polymer component different from the first polymer component (A) selected from poly(L-lactide), poly(D-lactide), poly[(L-lactide)-co-(ε-caprolactone)] and poly[(D-lactide)-co-(ε-caprolactone)], wherein the first and second polymer components (A) and (B) are selected such that the resulting polymer blend comprises a combination of constitution units derived from L-lactide and constitution units derived from D-lactide. The highly elastic material may be processed by (Continued)

Figure 1:
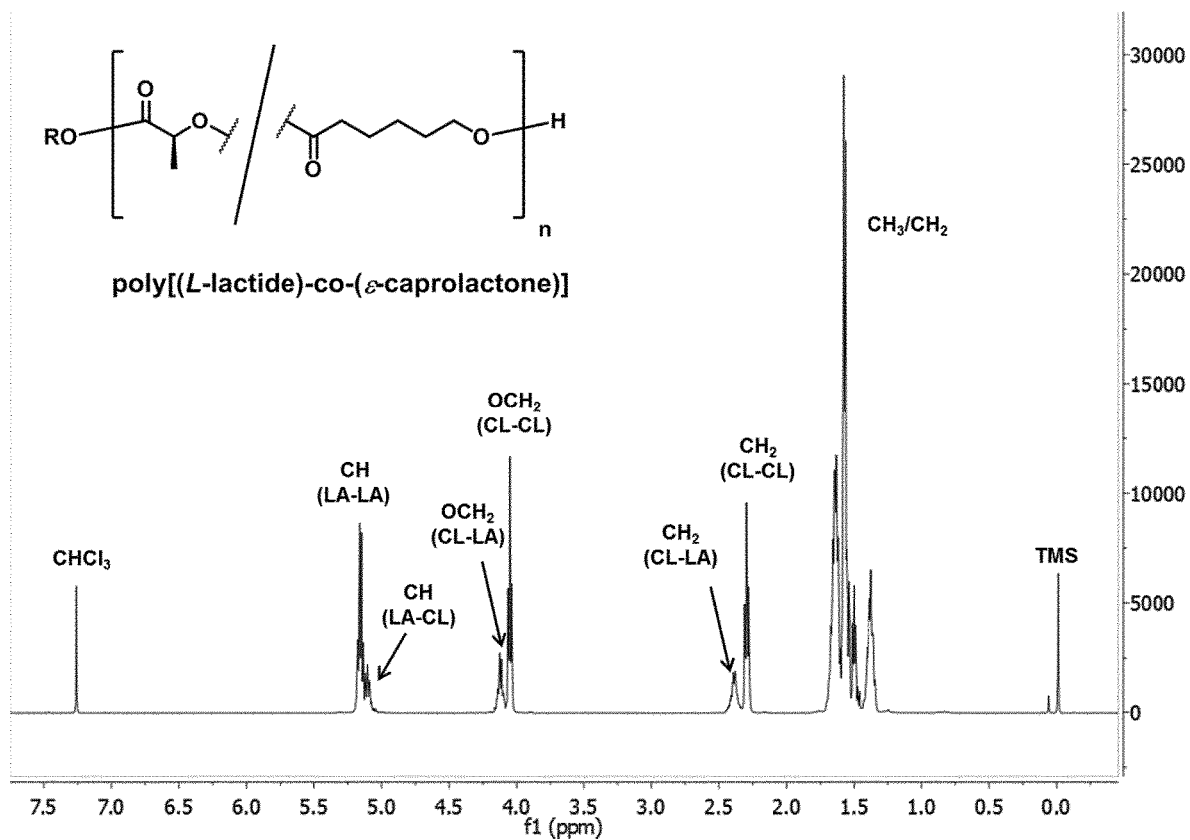

electrospinning to produce elastic porous objects having a non-woven fibrous structure.

16 Claims, 5 Drawing Sheets

(58) Field of Classification Search
USPC .......................................................... 525/444
See application file for complete search history.

(56) References Cited

OTHER PUBLICATIONS

International Search Report dated Oct. 25, 2018 in PCT/EP2018/076136.
Cordier et al., "Self-healing and thermoreversible rubber from supramolecular assembly", Nature 2008, 451, 977-980.
Lv et al., "Strong Confinement Effects on Homocrystallization by Stereocomplex Crystals in Electrospun Polylactide Fibers", J. Phys. Chem. B 2015, 119, 15530?15535.
Zhang et al., "Mechanical Property Enhancement of Polylactide Nanofibers through Optimization of Molecular Weight, Electrospinning Conditions, and Stereocomplexation", Macromolecules 2012, 45, 5494-5500.
Fundador et al., "Structural Properties and Enzymatic Degradation Behavior of PLLA and Stereocomplexed PLA Nanofibers", Macromol. Mater. Eng. 2010, 295, 865-871.
Forouharshad et al., Biobased System Composed of Electrospun sc-PLA/POSS/Cyclodextrin Fibers To Remove Water Pollutants, ACS Sustainable Chem. Eng. 2015, 3, 2917-2924.
Monticelli et al., "New Stereocomplex PLA-Based Fibers: Effect of POSS on Polymer Functionalization and Properties", Macromolecules 2014, 47, 4718-4727.
Stoyanova et al., "Electrospun non-woven mats from stereocomplex between high molar mass poly(L-lactide) and poly(D-lactide)-block-poly(butylene succinate) copoly(ester urethane)s", European Polymer Journal 2012, 48, 1965-1975.
Zhang et al., "Intermolecular ordering as the precursor for stereocomplex formation in the electrospun polyactide fibers", Polymer, 60, 2015, 221-227.

* cited by examiner

HIGHLY ELASTIC LACTIDE-BASED POLYMER BLEND, OBJECT MADE FROM THE POLYMER BLEND AND METHOD OF PRODUCING THE OBJECT

The work leading to this invention has received funding from the European Union Seventh Framework Programme FP7/2007-2013 under Grant Agreement no 604049.

CROSS-REFERENCE TO RELATED APPLICATIONS

This application is a § 371 national phase entry of International Patent Application No. PCT/EP2018/076136, filed Sep. 26, 2018, which claims priority to and the benefit of European Application No. 17193882.2, filed Sep. 28, 2017, both of which are hereby incorporated herein by reference in their entireties.

The invention is related to a highly elastic or hyperelastic polymeric system comprising a lactide-based polymer blend. The invention is further related to a porous object made from the polymer blend and having a non-woven fibrous structure. The invention is further related to a method of processing the polymer blend of the invention and a method of producing the object by electrospinning.

Typical hyperelastic polymers are vulcanized elastomers such as rubber. However, rubber is not hydrolytically degradable.

A general requirement for hyperelasticity of polymers is that the polymer is provided as a network in which the polymer chains are interconnected via crosslinks (also referred to as net points). In case of covalent networks such as rubber or polyglycerol sebacate, where covalent chemical bonds interconnect the polymer chains, the polymeric materials are referred to as thermosets. After the curing where the covalent crosslinks are formed, thermosets cannot be transformed into another shape.

In non-covalent networks, on the other hand, the crosslinks are of physical nature and interconnect the polymer chains via ionic interactions, electrostatic interactions, Van-der-Waals bonds, hydrophobic-hydrophobic interactions, or the like. Non-covalent networks can be brought into another shape after heating the polymer system above the respective thermal transition, e.g. its melting point. The following approaches have been followed in order to form stable non-covalent crosslinks:

i) Hydrogen Bonds

Thermoreversible elastomers which are crosslinked via hydrogen bonds have been intensively investigated (e.g. Nature 2008, 451, 977-980 with further references). The strength of hydrogen bonds decreases with increasing temperature limiting this concept with respect to the temperature range. This effect has been shown by low melting points, for instance in PCL-based polyurethanes. Typical hydrogen-bond crosslinked elastomers have been implemented in non-degradable polymeric systems.

ii) Ionic Interactions

Netpoints provided by ionic interactions have typically been implemented in non-degradable polymers. Moreover, the biocompatibility of these materials may be affected due to metal ions released from these.

iii) Coordinate Bonds

Polymers which are crosslinked by way of coordination of metal ions through two electrons provided by an electronegative group (ligand, donor) have been described as well. However the heavy metals such as copper which are required as electron acceptor are not biocompatible with respect to biomedical applications.

iv) Crystallites

In semi-crystalline polymers crystallites may serve as temporary net points. For applications in a certain temperature range the melting range of the crystallites must be higher than the application temperature and must not decrease by degradation and/or water uptake during appliance. Polymer systems of known biodegradable and biocompatible monomers are further described as follows. For instance, the applicability of systems comprising poly($\varepsilon$-caprolactone)-crystallites ($T_m$~60° C.) as net points at physiological conditions (i.e. 37° C., water) is very limited, because the melting temperature rapidly decreases at these conditions and a significant creep arises in the materials. Other systems, such as poly (para dioxanone) show a good formation of crystallites having a $T_m$ of about 100-110° C. However, they are very prone to hydrolytic degradation such that at physiological conditions the material properties cannot be maintained over a long period. Polylactide forms crystallites having a melting temperature of 140-175° C. However, the rate of crystallisation is very slow usually allowing only for a very low number of crystallites. The formation of crystallites in polylactide-based materials can be supported by crystallisation points, for which stereo complexes of poly(D-lactide) (PDLA) and poly(L-lactide) (PLLA) have found to be useful.

Triblock copolymers comprising a central poly[($\varepsilon$-caprolactone)-co-($\delta$-valerolactone)]-block und terminal PDLA or PLLA sequences exhibit an elastic behaviour with elongations at break of more than 700%. However, polymers having only low molecular weights ($\leq$85 kDa) could be achieved in this way. The elastic modulus of these materials comprising stereo complexes was >40 MPa (ACS Sustainable Chem. Eng. 2016, 4, 121-128).

Other triblock copolymers have been reported comprising a central statistical copolymer block of poly[(D,L-lactide)-co-($\varepsilon$-caprolactone)] and terminal PDLA or PLLA blocks (Journal of Polymer Science, part A: Polymer Chemistry 2015, 53, 489-495). The polymers had very high elongations at break of up to 2800%. For appliances at physiological conditions requiring maintenance of the elastic properties and shape stability over a long period (involving partial material degradation), these block copolymers are not useful, as it is expected that the amorphous segments (copolymer blocks) that are responsible for the elasticity are much faster hydrolytically degraded than the semi-crystalline segments (PDLA or PLLA respectively).

Beside the problems related to the aforementioned lactide-based systems, another drawback is that the synthesis of triblock copolymers is very demanding involving a plurality of steps.

With respect to another aspect of the invention, there is a demand of a manufacturing process of highly elastic complex three-dimensional objects having a porous structure. Generally there are two approaches allowing precise control of the geometry, namely 3D-printing and electrospinning.

3D-printing, however, usually requires the use of covalently cross-linked polymers in order to achieve high strength of the object. Covalent crosslinking may for instance be achieved by photopolymerization methods. Moreover, precise structure dimensions in the range of few µm cannot be achieved with 3D-printing.

In electrospinning, non-woven fabrics are prepared from polymer fibers having a thickness in the µm or even nm region (microfibers or nanofibers). In order to produce objects having a high form stability chemical (covalent) or physical (non-covalent) net points have to be formed during or after electrospinning. Stereocomplexes between PLLA and PDLA are known to be useful in this regard. The production of nanofibers of blends of poly(L-lactide) and poly(D-lactide) by electrospinning has been reported (JP 2008-115503 A; J. Phys. Chem. B 2015, 119, 15530-15535; Macromolecules 2012, 45, 5494-5500; Macromol. Mater. Eng. 2010, 295, 865-871; Polymer 2015, 60, 221-227) or from poly(L-lactide) and poly(D-lactide) with the addition of POSS (ACS Sustainable Chem. Eng. 2015, 3, 2917-2924; Macromolecules 2014, 47, 4718-4727). Electrospun blends of poly(L-lactide) and poly(D-lactide) are characterized by very high elastic moduli in the magnitude of GPa but comparably low elongation at break (typically below 150%). On the other hand, electrospun materials of block copolymers having blocks of poly- or oligo-lactide exhibit high elasticity and low elastic modulus. Examples are blends of poly(L-lactide) and poly[(D-lactide)-block-(poly(butylene succinat) copoly(ester urethane)](European Polymer Journal 2012, 48, 1965-1975). However, as mentioned above the synthesis of these block copolymers is demanding and cannot be done from renewable resources.

BRIEF DESCRIPTION OF THE INVENTION

Accordingly, there is a demand for biocompatible and biodegradable polymeric materials that are highly elastic in a physiological temperature range and have a high degree of shape stability when mechanically deformed. Ideally, the polymeric system should be capable of being synthesized from renewable raw materials in an easy and cost efficient way.

There is also a demand of highly elastic objects which can be prepared in a feasible manner from renewable resources which have a high elongation at break and a relative low elastic modulus.

These objects are at least partially solved by a polymer blend, an object prepared from the polymer blend and a method of processing the polymer blend or of producing an object as defined in the independent claims.

The polymer blend according to the present invention comprises or consists of:
(A) a first polymer component, being a copolymer having a substantially random, partially blocky structure and selected from poly[(ε-caprolactone)-co-(L-lactide)] and poly[(ε-caprolactone)-co-(D-lactide)] and
(B) a second polymer component different from the first polymer component (A) selected from poly(L-lactide), poly(D-lactide), poly[(ε-caprolactone)-co-(L-lactide)] and poly[(ε-caprolactone)-co-(D-lactide)], wherein the first and second polymer components (A) and (B) are selected such that the resulting polymer blend comprises a combination of constitution units derived from L-lactide and constitution units derived from D-lactide.

According to the invention the polymer blend has two or more polymer components, which combine constitution units derived from L-lactide (LLA) and constitution units derived from D-lactide (DLA). More precisely, in case the first polymer component comprises LLA as constitution units or segments of oligo-LLA in the copolymer, then the second polymer component is selected to comprise DLA as constitution units or segments of oligo-DLA in the homopolymer or in the copolymer, respectively. On the other hand, in case the first polymer component comprises DLA as constitution units or segments of oligo-DLA in the copolymer, then the second polymer component is selected to comprise LLA as constitution units or segments of oligo-LLA in the homopolymer or in the copolymer, respectively. These two stereoisomers of lactide (LA) form stereocomplexes in the form of pairs of oligo-LLA/oligo-DLA in the blend which in turn give rise to the formation of crystallites acting as physical (non-covalent) netpoints crosslinking the polymeric chains of the polymer blend. As a result of these netpoints and other features of the polymer (low $T_g$, high $M_w$), the polymeric material is highly elastic with a high elongation at break, typically in the range of 550 to 1000%.

The polymeric material according to the invention has the following characteristics:
- high elongation at break, in the range of 400 to 1000%, typically of 550 to 1000%
- high shape stability at strong elastic deformations
- low creeping at permanent mechanical strain (dynamic deformation)
- material properties can be varied by adjustment of the mixing ratio of the first and second polymer components
- specific structural parameters are known
- biological/hydrolytic degradability
- high biocompatibility
- feasible production in few process steps; no synthesis of triblock copolymers necessary
- availability of educts from renewable sources
- physical crosslinking of the polymer blend which is stable in a wide temperature range even at physiological conditions
- easy processability of the blend from its solution due to the absence of stereocomplex-induced crystallites in suitable solvents
- readily formation of crystallites from stereocomplexes in the solvent-free state at room temperature
- re-processability of the material after dissolution of the blend Another aspect of the invention is related to a method of processing a polymer blend according to the invention. The method comprises:
- providing a solution of the polymer blend of the invention in a solvent,
- subjecting the solution to electro spinning to produce fibers of the polymer blend, and
- depositing the fibers to form a non-woven fibrous structure building-up the object.

Thus, by way of electrospinning an object can be produced from the polymer material of the invention which has a porous, non-woven fibrous structure built-up of the polymer fibers and may have a complex three-dimensional shape. After electrospinning, the stereocomplexes between the oligo-LLA sequences of the first polymer component and the oligo-DLA sequences of the second polymer component are formed either instantaneously or after annealing the scaffold at temperatures above the glass transition of polylactide ($\geq 50°$ C.) for a short time period (several hours or days) imparting a high elasticity and stability to the material due to formation of crystalline domains in the polymer. The electrospun material is characterized by a very high elasticity (high elongation at break) and low elastic modulus. The electrospun material further has a very high shape stability (shape recovery) when dynamically deformed.

Accordingly, another aspect of the invention relates to an object prepared from the polymer blend according to the present invention, the object having a porous, non-woven fibrous structure.

Further embodiments of the invention are subject of the dependent claims.

In the absence of an indication to the contrary, the various embodiments of the invention disclosed in the present claims, description or figures may be combined with each other.

DETAILED DESCRIPTION OF THE INVENTION

Figure 2:
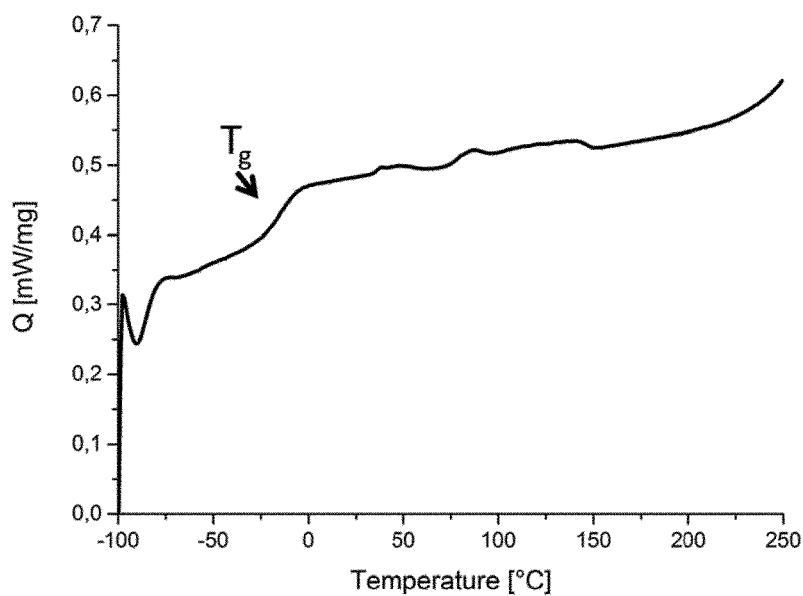
Figure 3:
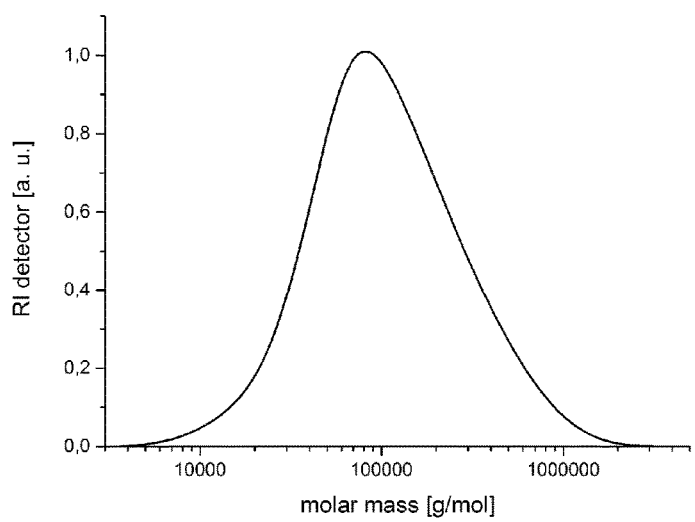
Figure 4:
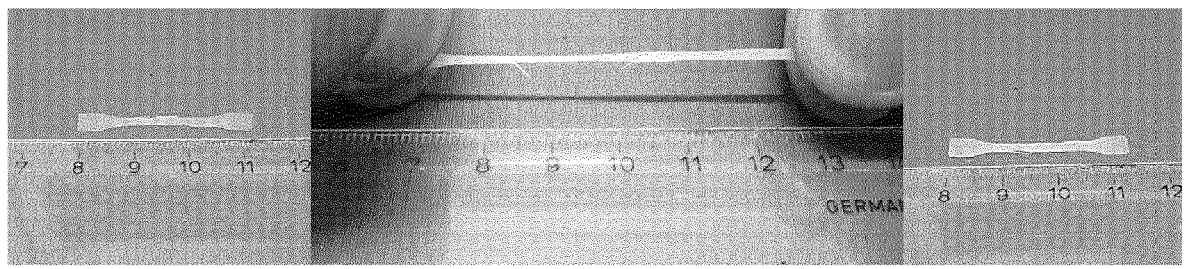
Figure 5:
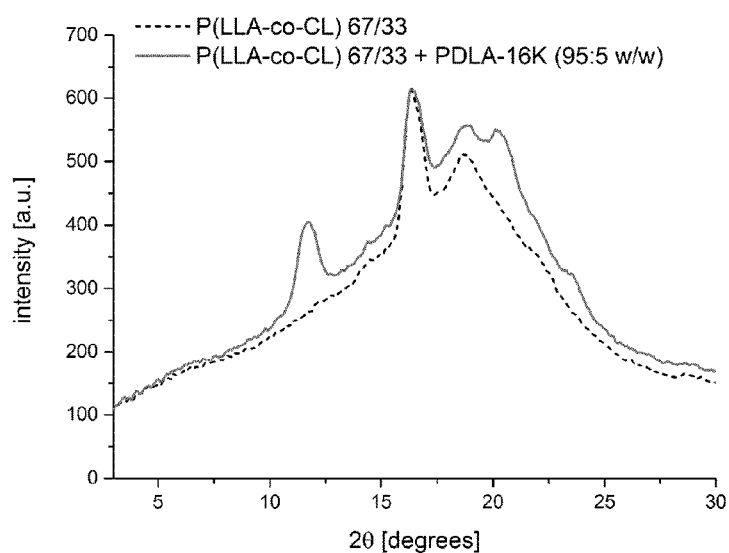
Figure 6:
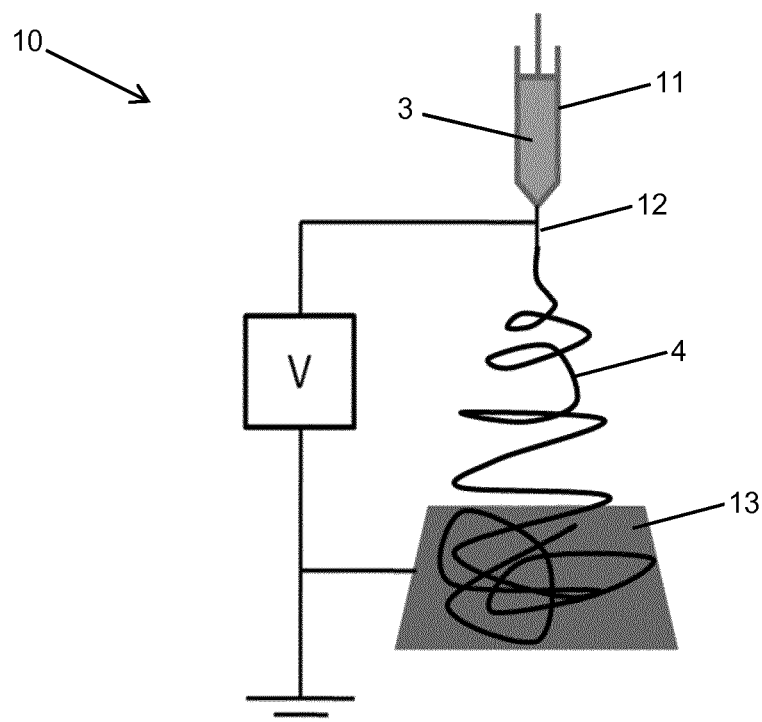
Figure 7:
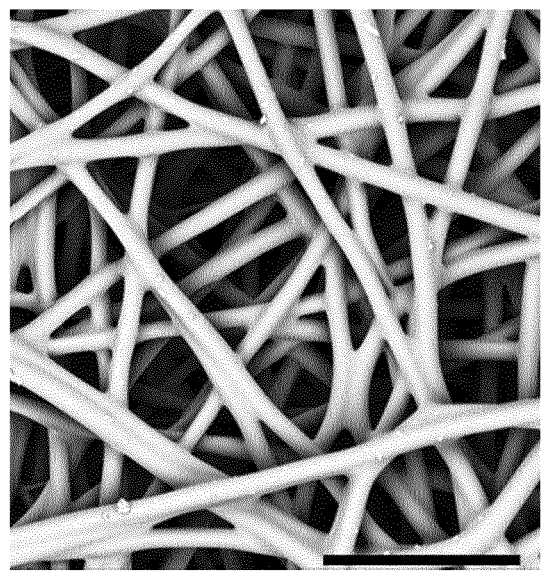
Figure 8:
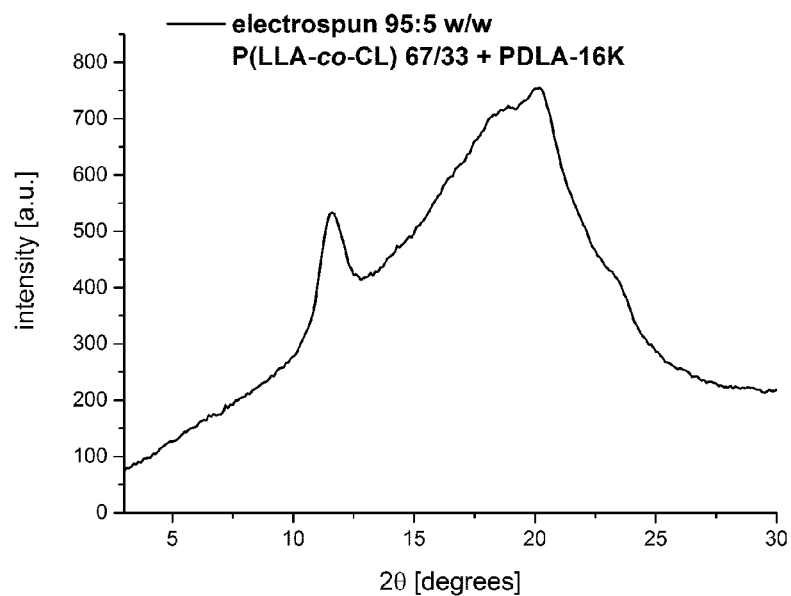
Figure 9:
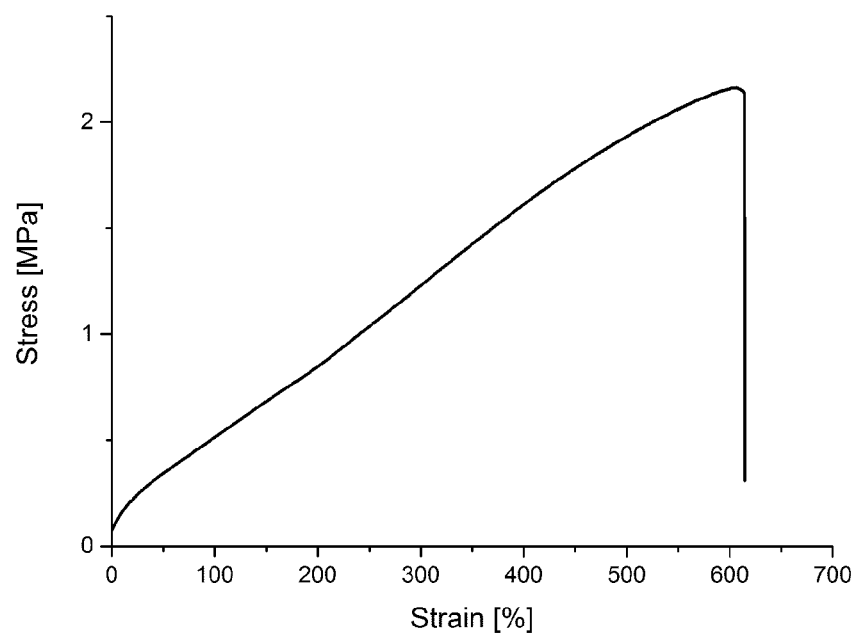
Figure 10:
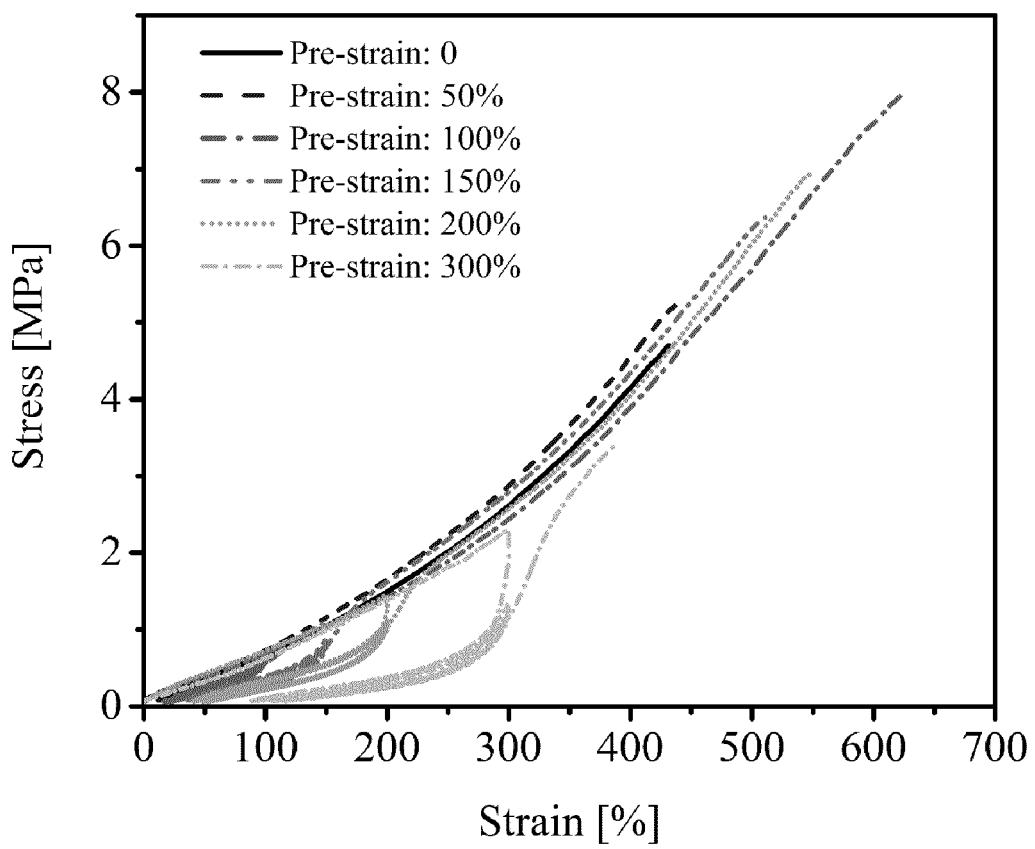

The invention will be described in more detail by way of examples. The Figures show:

FIG. 1 $^1$H-NMR-spectrum of the copolymer poly[(L-lactide)-co-(ε-caprolactone)]having a molar fraction of LLA:CL of 72:28 [P(LLA-co-CL) 72/28];

FIG. 2 DSC-curve of the copolymer (P(LLA-co-CL) 67/33);

FIG. 3 GPC-chromatogram of the copolymer P(LLA-co-CL) 67/33;

FIG. 4 photograph series of a polymer film made from a polymer blend of [90:10 w/w P(LLA-co-CL) 67/33+PDLA-16k], from the left to the right: before elongation, during elongation, and after elongation;

FIG. 5 WAXS diffraction pattern of a polymer film made from the copolymer P(LLA-co-CL) 67/33 and a polymer film made from a polymer blend of [95:5 w/w of P(LLA-co-CL) 67/33+(PDLA)-16k];

FIG. 6 basic setup of an electrospinning apparatus;

FIG. 7 scanning electron microscopy (SEM) image of electrospun fibers [95:5 w/w P(LLA-co-CL) 67/33+PDLA-16k]; average fiber diameter=1.8±0.3 µm; scale bar represents 20 µm;

FIG. 8 WAXS diffraction pattern of electrospun [95:5 w/w P(LLA-co-CL) 67/33+PDLA-16k]; degree of total crystallinity (Xc)=26%;

FIG. 9 Stress/strain diagram of electrospun [95:5 w/w P(LLA-co-CL) 67/33+PDLA-16k] obtained by tensile testing in water at 37° C.; and FIG. 10 Stress/strain diagrams of electrospun [95:5 w/w P(LLA-co-CL) 67/33+PDLA-16k] after applying different amounts of pre-strain (tensile test; 3 cycles).

The invention provides a highly elastomeric lactide-based polymeric material that is hydrolytically degradable and biocompatible.

The polymer blend comprises or consists of:
(A) a first polymer component, being a copolymer having a substantially random, partially blocky structure and selected from poly[(L-lactide)-co-(ε-caprolactone)] (also referred to as P(LLA-co-CL)) and poly[(D-lactide)-co-(ε-caprolactone)] (also referred to as P(DLA-co-CL)) and
(B) a second polymer component different from the first polymer component (A), selected from poly(L-lactide) (also referred to as PLLA), poly(D-lactide) (also referred to as PDLA), poly[(L-lactide)-co-(ε-caprolactone)] (P(LLA-co-CL)) and poly[(D-lactide)-co-(ε-caprolactone)] (P(DLA-co-CL)).

The first and second polymer components (A) and (B) are selected such that the resulting polymer blend comprises a combination of constitution units derived from L-lactide (LLA) and constitution units derived from D-lactide (DLA).

The combination of constitution units derived from L-lactide and constitution units derived from D-lactide in the polymer blend allows for the formation of stereocomplexes between oligo sequences of L-lactide (oligo-LLA, present in the first or in the second component) and the complementary oligo sequences of D-lactide (oligo-DLA, present in the second or in the first component). The stereocomplexes form crystallites acting as physical (non-covalent) net points crosslinking the polymer components. Due to these net points the polymer material exhibits a high degree of elasticity.

First Polymer Component (A)

The first polymer component is a copolymer (dicopolymer) of units derived from E-caprolactone (CL) and units derived either from L-lactide (LLA) or from D-lactide (DLA).

In embodiments, the first polymer component (A) has a weight average molecular weight $M_w$ of at least 80 kDa, preferably of at least 100 kDa. A high molecular weight of ≥80 kDa enhances the elasticity of the material by increasing the entanglement of the polymer chains. The upper value of the molecular weight of the first polymer component is not particularly limited in terms of material properties. However, it may be difficult to achieve molecular weights $M_w$ of more than 300 kDa by standard synthesis methods of the copolymer. The weight average molecular weight $M_w$ can be measured by universally calibrated gel permeation chromatography (GPC).

The copolymer preferably has a substantially random, partially blocky structure. The term "partially blocky" means that the copolymer comprises some block sequences of oligo(L-lactide) or oligo(D-lactide), respectively. The block sequences of oligo(L-lactide) or oligo(D-lactide) in the copolymer allow the formation of stereocomplexes with the corresponding complementary sequences, i.e. oligo(D-lactide) or oligo(L-lactide), of the second polymer component (B). More precisely, when the first polymer component (A) is poly[(L-lactide)-co-(ε-caprolactone)] its oligo(L-lactide) sequences will form stereocomplexes with oligo(D-lactide) sequences of the second component (B). When the first polymer component (A) is poly[(D-lactide)-co-(ε-caprolactone)] its oligo(D-lactide) sequences will form stereocomplexes with oligo(L-lactide) sequences of the second component (B).

The weight content of ε-caprolactone in the first polymer component (A) may be in the range of 25 to 47 wt %, particularly in the range of 33 to 44 wt %, preferably in the range of 36 to 40 wt %, based on the total weight of the copolymer (A) (100 wt %). When the weight content of ε-caprolactone in the first polymer component (A) is less than 25 wt %, the glass temperature $T_g$ of the copolymer will increase with the effect that the material at room temperature is in the glass state, i.e. that the material is not elastic. If however the weight content of ε-caprolactone in the first polymer component (A) is more than 47 wt %, the formation of the oligo-lactide blocks during the synthesis may be hindered resulting in low or no formation of crystallites in the polymer blend.

The weight content of ε-caprolactone in the first polymer component (A) determines the glass temperature $T_g$ of the copolymer (and hence of the polymer blend) and, on the other hand, influences the partial formation of oligo blocks of oligo-LLA or oligo-DLA in the copolymer. In copolymers comprising monomers that can be ideally mixed with each another, such as in the case of lactide (LA) and ε-caprolactone (CL), the theoretical glass transition temperature $T_{g,t}$ can be calculated by the Fox-Equation below, where $w_1$ and $w_2$ are the weight fractions of monomer 1 and monomer 2 and $T_{g1}$ and $T_{g2}$ are the glass transition temperatures of the corresponding homopolymers of monomer 1 and monomer 2, respectively:

$$\frac{1}{T_{g,t}} = \frac{w_1}{T_{g_1}} + \frac{w_2}{T_{g_2}}$$

In the present invention, a glass transition temperature $T_g$ of the polymer blend of ≤0° C. is preferred in order to obtain a material that exists in its elastic state at room temperature. According to the above Fox-Equation with $T_{g,PCL}=-60°$ C. and $T_{g,PLA}=50°$ C. a theoretical weight ratio of ≤65 wt % of LA (LLA or DLA) and ≥35 wt % of CL results to obtain the desired $T_g$ of the copolymer. However, the true glass transition temperature $T_g$ of a real copolymer is influenced by two factors. First, it has to be considered that during the synthesis of the copolymer by copolymerisation of the two comonomers, not necessarily all comonomers may be incorporated into the polymer chain resulting in a deviation of the fractions of the comonomers in the obtained copolymer from the fraction of the comonomers used in the synthesis mixture. In addition, crystallized segments in the polymer chain do not contribute to the $T_g$. Accordingly, differential scanning calorimetry (DSC) and nuclear magnetic resonance (NMR) experiments were made in order to determine the comonomer fractions of CL and LA in the copolymer necessary for achieving the desired $T_g$.

As mentioned before, the first polymer component (A) preferably has a partially blocky structure. The degree of block segments in copolymers can be expressed by the average dyad ratio. The dyad ratio is the molar ratio of the number of homodimers of the same type of comonomer present in the polymer chain (comonomer 1-comonomer 1) to a heterodimer formed by two different comonomers (comonomer 1-comonomer 2). The dyad ratio can be determined by $^1$H-NMR. In the present invention, the first polymer component (A) preferably has a dyad ratio of lactide-lactide dyads (LA-LA) to lactide-ε-caprolactone dyads (LA-CL) of at least 2.5:1. When the dyad ratio is less than 2.5:1 the occurrence of blocks of oligolactide in the copolymer becomes low so that the formation of stereocomplexes in the polymer blend also becomes low.

The function of ε-caprolactone in the copolymer is to form an amorphous phase at the desired temperature of use, particularly at room temperature. For this purpose, a fraction of ε-caprolactone present in an amorphous phase in the first polymer component (A) is at least 25 mol %, preferably in the range of 27-33 mol %, based on the total molar amount of ε-caprolactone in the first polymer component (A).

The first polymer component (A) can be synthesised by copolymerising a mixture of the comonomers ε-caprolactone and L,L-dilactide or of ε-caprolactone and D,D-dilactide in the desired mixing ratio through ring opening copolymerisation.

Second Polymer Component (B)

According to embodiments of the invention, in case the second polymer component (B) is either PLLA or PDLA, its weight average molecular weight $M_w$ is in the range of 1 to 40 kDa, preferably of 2 to 20 kDa. By providing a molecular weight of the second polymer component (B) of below 40 kDa, its mobility within the blend is increased. As the corresponding oligo-LLA or oligo-DLA segments of the second polymer component (B) in a blend with the first component (A) give rise to formation of stereocomplexes that serve as nucleation sites for the formation of crystallites, the increased mobility leads to a higher velocity of the formation of crystallites and faster propagation of crystallization. On the other hand, by providing a molecular weight of the second polymer component (B) of above 1 kDa, the size and hence the stability of the stereocomplexes are increased.

The second polymer component (B) can be synthesised by homopolymerising the monomers L,L-dilactide or D,D-dilactide, respectively through ring opening polymerisation. In case the second polymer component (B) is selected from poly[(L-lactide)-co-(ε-caprolactone)] or poly[(D-lactide)-co-(ε-caprolactone)], its synthesis can be done in the same way as described for the first polymer component (A).

Regarding the further properties of the P(LLA-co-CL) or P(DLA-co-CL) when used as the second polymer component (B) the same consideration as set with respect of the first component (A) apply.

Polymer Blend

Preferably, the polymer blend is a binary composition comprising not more than the two polymers selected from the first polymer component (A) and the second polymer component (B).

In embodiments of the invention, the second polymer component (B) is selected from poly(L-lactide) and poly(D-lactide). In this case the polymer blend preferably comprises or consists of 80 to 99 wt % of the first polymer component (A) and 1 to 20 wt % of the second polymer component (B). More preferably the polymer blend comprises or consists of 85 to 97 wt % of the first polymer component (A) and 3 to 15 wt % of the second polymer component (B). Even more preferably, the polymer blend comprises or consists of 90 to 95 wt % of the first polymer component (A) and 5 to 10 wt % of the second polymer component (B). By adjusting the mixing ratio of the first and second component the mechanical properties of the material can be adjusted according to a desired appliance. Moreover, when the content of the second polymer component (B) in the blend is more than 20 wt % the material becomes brittle if the polymer component (B) is of low molecular weight. Furthermore, below 1 wt % and above 20 wt % the elongation at break decreases. Accordingly, a weight content of the second polymer component (B) in the range of 1 to 20 wt %, particularly of about 10 wt %, imparts the highest values of elongation at break.

In other embodiments of the invention, the second polymer component (B) is selected from poly[(L-lactide)-co-(ε-caprolactone)] and poly[(D-lactide)-co-(ε-caprolactone)]. In this case, the polymer blend preferably comprises or consists of 50 to 95 wt % of the first polymer component (A) and 5 to 50 wt % of the second polymer component (B).

Preferred polymer blends according to the present invention are: a blend comprising poly[(L-lactide)-co-(ε-caprolactone)] and poly(D-lactide) (P(LLA-co-CL)/PDLA), a blend comprising poly[(D-lactide)-co-(ε-caprolactone)] and poly(L-lactide) (P(DLA-co-CL)/PLLA), and a blend comprising poly[(L-lactide)-co-(ε-caprolactone)] and poly[(D-lactide)-co-(ε-caprolactone)](P(LLA-co-CL)/P(DLA-co-CL)).

The polymer blend can easily be prepared by mixing the first and second polymer component in the target mixing ratio as set forth above. For this purpose, the single components (A) and (B) in the desired weight ratio may be added to a suitable solvent and mixed to obtain a solution of the mixed polymer compounds. The solvent may then be removed. Alternatively, the single components (A) and (B) may be dissolved individually in a suitable solvent followed by mixing the solutions and then removing the solvent. If desired, before removing the solvent, the mixed solution can be processed to a molded object. In the mixed solution in a suitable solvent no stereocomplexes are formed allowing an easy processing of the solution containing the polymer blend. Only after removing the solvent the stereocomplexes will be formed resulting in the elastomeric material.

The polymer blend according to the present invention is at room temperature highly elastic or even hyperelastic. Moreover, the material shows a high degree of shape stability. The term shape stability indicates the degree of restauration of the initial shape after releasing the deformation force. The blend preferably has an elongation at break in the range of 400 to 1000% at 25° C. The elongation at break can be determined by uniaxial tensile testing of thin films and/or electrospun mats. Further, polymer blend according to the present invention may have an elastic modulus in the range of 25 to 150 MPa at 25° C. The elastic modulus can be determined by uniaxial tensile testing of thin films and/or electrospun mats.

Method of Processing the Polymer Blend

The polymer blend according to the present invention may be processed into a three-dimensional object by any standard moulding technique.

For instance, due to the fact that the stereocomplexes oligo-LLA/oligo-DLA are cleaved when the blend is dissolved in a suitable solvent, the material may easily processed by dissolving the polymer blend in a suitable solvent, bringing the solution into the desired shape, and then removing the solvent. After removal of the solvent, the stereocomplexes will readily form even at room temperature or after annealing at elevated temperatures above $T_g$ of PLA ($\geq 50°$ C.) resulting in a highly elastic object having the desired three dimensional shape.

However, in advantageous embodiments, the polymer material of the invention is processed by electrospinning as to form an object having a porous, non-woven fibrous structure.

The method of processing the polymer blend comprises the steps of:
providing a solution of the polymer blend according to the invention in a solvent,
subjecting the solution to electrospinning to produce fibers of the polymer blend, and
depositing the fibers to form a non-woven fibrous structure building-up the object.

In the first step, any solvent or solvent mixture can be used that is capable of dissolving the polymer blend. Due to its rather hydrophilic nature suitable solvents comprise hydrophilic solvents such as alcohols. In an example, the solvent is hexafluoro isopropanol (HFIP).

In the step of electrospinning fibers are formed of the polymer blend. The electrospinning apparatus comprises a reservoir for storing the polymer solution (typically a syringe) and equipped with a needle, and a collector positioned with a predetermined distance to the needle tip and acting as target. Between the needle and the collector a voltage is applied. During electrospinning the polymer solution is pressed through the needle, charged by the voltage and accelerated in the electric field towards the collector where it is deposited. Accordingly, the step of electrospinning and the step of depositing are typically conducted in parallel.

The step of depositing the polymer fibers may be conducted such that the fibers are deposited on the collector. The shape of the collector determines the shape of the object formed in the process. For example, the collector may be a simple flat plate. In this case, flat non-woven fiber structures are formed. However, for producing more complex shapes, the collector may have a shape which acts as mould for the shape of the object to be formed. Moreover, the collector may be a static such that no movement relative to the needle tip occurs. In embodiments, the collector may be movable in one, two or three directions with respect to the needle tip and/or rotatable allowing the formation of complex three-dimensional structures by moving the collector.

There are various process parameters during electrospinning which can be varied in order to control the properties of the polymer fibers. The process parameters comprise humidity of the atmosphere, the voltage applied to the needle and collector, the distance between needle and collector, polymer concentration of the polymer solution, solvent of the polymer solution, flow rate of the polymer solution through the needle, shape of the needle tip, rotation speed of the collector, etc.

In preferred embodiments, the process parameters during electrospinning are selected such that fast evaporation of the solvent is achieved. In other embodiments, the process parameters during electrospinning are selected as to control formation of the stereocomplexes. In still other embodiments, the process parameters during electrospinning are selected as to minimize shrinking of the spun fibers and structures formed thereof due to entropic relaxation.

After depositing the fibers, the object thus formed may be subjected to a thermal treatment, preferably at temperatures in the range of 60 to 120° C. The thermal treatment supports the formation of stereocomplexes and increases the crystallinity.

Object Prepared from the Polymer Blend

The object prepared from the polymer blend may have any shape and may have a porous or compact (non-porous) structure.

Non-porous structures may be produced by standard casting or moulding techniques. Objects of non-porous structures will have the elastic moduli and elongation at break as described with respect to the polymer blend.

Porous fibrous structures may be produced by electrospinning techniques as described above. The porous nature results from the non-woven structure formed by the deposited fibers. Typically an average pore diameter may be controlled to be in the range of several hundreds of nanometres to several hundreds of micrometres by varying the electrospinning process parameters mentioned above. In examples, the average pore diameter is in the range of 1 μm to 200 μm.

In embodiments, the fibers that build-up the electrospun porous object have an average fiber diameter in the range of 0.5 to 10 μm, particularly in the range of 1 to 5 μm, preferably in the range of 1.5 to 3 μm. The fiber diameter can be controlled by varying the electrospinning process parameters mentioned above.

Due to its porosity, the electrospun object has substantially the high elasticity (elongation at break) described with respect of the polymer blend, but has lower E-moduli, typically in the magnitude of a few MPa. In embodiments, the object has an elongation at break at 25° C. in the range of 250 to 850%, particularly in the range of 350 to 700%. In further embodiments, the object has an elastic modulus at 25° C. in the range of 0.3 to 5 MPa, particularly in the range of 0.5 to 1.5 MPa.

Applications of the Electrospun Objects

High elasticity and porosity of the devices are required for many medical applications. Because of these properties, the materials can expand or contract upon the physiological requirements (elasticity) and at the same time allow exchange of nutrients, salts, cellular waste products, gasses, and the migration of cells similar to the situation in native tissues (porosity). Devices with low E-moduli in the MPa range exhibiting high long-term form stability under dynamic mechanical stress under physiological conditions are particularly suitable as implants in tissue with frequently occurring movements.

Likewise, the permeation properties can be exploited for non-medical, technical applications such as separation membranes, pollen and cabin filters, or breathable textiles.

Working Examples

Synthesis of First Polymer Component (A)

The synthesis of the copolymer component was performed by tin(II) 2-ethylhexanoate (Sn(oct)$_2$) catalyzed ring-opening polymerization of a mixture of ε-caprolactone and L,L-dilactide (or D,D-dilactide) in the melt. The synthesis was done using different comonomer ratios (LA:CL$_{syn,m}$) as indicated in Table 1.

A typical protocol for the synthesis is as follows: A 500 mL flame-dried three-neck-flask (equipped with magnetic stirring rod, rubber septum, PTFE valve and glass stopper) under argon atmosphere was loaded with L,L-dilactide (60.0 g, 416.3 mmol) (or D,D-dilactide, respectively) and ε-caprolactone (38 mL, 40-41 g, 350-360 mmol), that was purified by distillation. The reaction vessel was placed into a preheated oil bath (140° C.) and the mixture was magnetically stirred until complete melting/dissolution. Then a dilute solution of Sn(oct)$_2$ in anhydrous THF (e.g. 5.1 mL with a concentration of 24.7 mg/mL Sn(oct)$_2$) was added dropwise and the resulting mixture was stirred for 20 to 70 h at 140° C. to become a highly viscous polymer melt. The reaction vessel was removed from the oil bath and the crude product was allowed to cool to room temperature, dissolved in 2 L of chloroform, followed by precipitation in 20 L of methanol. The precipitate was dried under reduced pressure at 60° C. The yield of the copolymer was typically in the range of 80-90 g.

The molar comonomer ratios (LA:CL$_{NMR,m}$) in the copolymer were determined by $^1$H-NMR-measurements. FIG. 1 shows the $^1$H-NMR-spectrum of copolymer compound A6. The molar ratio of lactide and ε-caprolactone in the copolymer was determined from these spectra by comparison of the peak integrals of CH-moieties related to lactide (5.06-5.20 ppm) and of CH$_2$-moieties related to ε-caprolactone (4.02-4.15 ppm). The crude polymerization product usually displays a heterogeneous distribution of LA and CL units, with more LA-rich copolymer in the middle of the reaction vessel, and more CL-rich copolymer next to the walls of the reaction vessel, respectively. The purified product (after dissolution and precipitation) displays a homogenous distribution of LA/CL contents. For analysis, prior to purification, typically several grams of crude product were removed from the reaction vessel. Thus the LA/CL-composition in the purified copolymers in some cases differs from that of the employed monomers for the synthesis.

The $^1$H-NMR-spectra of the copolymers also allowed for the determination of the dyad ratios (DR) by integrating the signals related to LA-LA dyads (5.13 to 5.20 ppm) and those related to LA-CL dyads (5.07 to 5.13 ppm) and comparing the integrated intensities. The results are included in Table 1 as well.

The glass transition temperatures (T$_g$) of the copolymers were determined by DSC-measurements. FIG. 2 shows the DSC-plot of copolymer A2. The T$_g$ was found to be below 0° C. as intended.

The weight average molecular weight (M$_w$) of the copolymers were determined by GPC as shown in FIG. 3 for copolymer A2.

TABLE 1

Composition and properties of the synthesised copolymers.

| Example | LA | LA:CL$_{syn,m}$ | LA:CL$_m$ | LA:CL$_w$ | M$_w$ (kDa) | T$_g$ (° C.) | DR |
|---------|-----|------|------|------|-----|-----|------|
| A1 | LLA | 67/33 | 67/33 | 56:44 | 183 | −10 | 2.7:1 |
| A2 | LLA | 70/30 | 67/33 | 56:44 | 145 | −10 | 3.0:1 |
| A3 | LLA | 69/31 | 69/31 | 58:42 | 156 | −7 | 2.5:1 |
| A4 | LLA | 70/30 | 70/30 | 60:40 | 201 | −4 | 2.9:1 |
| A5 | LLA | 70/30 | 71/29 | 61:39 | 164 | −6 | 3.3:1 |
| A6 | LLA | 70/30 | 72/28 | 62:38 | 190 | −3 | 4.0:1 |
| A7 | LLA | 70/30 | 73/27 | 63:37 | 246 | −3 | 4.6:1 |
| A8 | DLA | 70/30 | 70/30 | 60:40 | 315 | −3 | 3.4:1 |
| A9 | DLA | 70/30 | 75/25 | 65:35 | 190 | −2 | 5.1:1 |

LA:CL$_{syn,m}$: molar ratio of LLA (or DLA) and CL as used in synthesis;
LA:CL$_m$: molar ratio of LA and CL as determined by $^1$H-NMR,
LA:CL$_w$: weight ratio of LA and CL as calculated from LA:CL$_m$,
M$_w$: weight average molecular weight as determined by GPC (universal calibration);
T$_g$: glass transition temperature as determined by DSC (2$^{nd}$ heating cycle);
DR: Ratio of LA-LA dyads to LA-CL dyads as determined by $^1$H-NMR.

Synthesis of Second Polymer Component (B)

The synthesis of the second polymer component was performed analogously to polymer component (A) for P(LLA-co-CL) and P(DLA-co-CL). PLLA and PDLA were synthesized by tin(II) 2-ethylhexanoate (Sn(oct)$_2$) catalyzed ring-opening polymerization of L,L-dilactide (or D,D-dilactide) in the melt. A typical protocol for the synthesis is as follows: A 500 mL flame-dried Schlenk-flask (equipped with magnetic stirring rod, NS 29 rubber septum and PTFE valve) under argon atmosphere was charged with D,D-dilactide (100.0 g, 639.8 mmol) (or L,L-dilactide, respectively). The reaction vessel was placed into a preheated oil bath (135° C.) and the mixture was magnetically stirred until complete melting. Anhydrous 1-hexanol (0.83 mL, 682 mg, 6.67 mmol) is added dropwise via syringe to the stirred melt of the dilactide. After 5 minutes a dilute solution of Sn(oct)$_2$ in anhydrous THF (e.g. 4.6 mL with a concentration of 24.5 mg/mL Sn(oct)$_2$) was added dropwise and the resulting mixture was stirred for 1 h at 135° C. to become a highly viscous polymer melt that solidifies towards the end of the reaction. The reaction vessel was removed from the oil bath and the crude product was allowed to cool to room temperature, dissolved in 400 mL of chloroform, followed by precipitation in 4 L of cold methanol. The precipitate was dried under reduced pressure at 60° C. The yield of the copolymer was typically in the range of 85-95 g.

The resulting homopolymer PDLA or PLLA had a weight average molecular weight as determined by GPC (universal calibration) of 16±2 kDa.

Preparation of the Polymer Blends and Films Thereof

In order to prepare the polymer blends, a mixture of the first polymer component (A) and the second polymer component (B) of 600 mg were added to 12 mL of chloroform, with weight ratios of A and B as listed in Table 2. The mixtures were agitated at 58° C. and 700 rpm for 2 h using a thermomixer. The resulting solutions were cooled to room temperature and poured into PTFE evaporation dishes. The dishes were tightly covered with aluminum foil and left for evaporation of the solvent in the hood for several days, followed by drying under reduced pressure at 60° C. overnight. The obtained polymer blend films had a thickness of 90 to 180 μm.

The films were characterised by uniaxial tensile testing to investigate their mechanical properties. The elastic modulus (E) and elongation at break ($\varepsilon_b$) are shown in Table 2. Blends of components (A) and (B) with different ratios were prepared and analysed to identify compositions with preferentially low E-modulus and high $\varepsilon_b$ values. However, the films made from the blend comprising 40 wt % of PDLA were too brittle for these tests. Films (blends) made of components (A) (P(LLA-co-CL) or P(DLA-co-CL)) with higher CL content show lower E-moduli and higher values for $\varepsilon_b$.

TABLE 2

Composition and mechanical properties of polymer films.

| # | (A) | (B)* | $w_A$ (wt %) | $w_B$ (wt %) | E (MPa)$^a$ | $\varepsilon_b$ (%)$^a$ |
|---|---|---|---|---|---|---|
| 1 | pLLACL 75/25$^b$ | — | 100 | — | 560 ± 35 | 134 ± 76 |
| 2 | pLLACL 75/25$^b$ | PDLA$^c$ | 95 | 05 | 79 ± 3 | 435 ± 25 |
| 3 | pLLACL 75/25$^b$ | PDLA$^c$ | 90 | 10 | 269 ± 30 | 472 ± 40 |
| 4 | pLLACL 75/25$^b$ | PDLA$^c$ | 80 | 20 | 91 ± 3 | 135 ± 9 |
| 5 | pLLACL 75/25$^b$ | PDLA$^c$ | 60 | 40 | — | — |
| 6 | pLLACL 67/33$^d$ | — | 100 | — | 36 ± 3 | 905 ± 51 |
| 7 | pLLACL 67/33$^d$ | PDLA$^c$ | 95 | 05 | 27 ± 1 | 889 ± 83 |
| 8 | pLLACL 67/33$^d$ | PDLA$^c$ | 90 | 10 | 26 ± 2 | 1019 ± 32 |
| 9 | pLLACL 71/29$^e$ | PDLA$^c$ | 100 | 0 | 40 ± 4 | 801 ± 50 |
| 10 | pLLACL 71/29$^e$ | PDLA$^c$ | 95 | 05 | 32 ± 5 | 684 ± 118 |
| 11 | pDLACL70/30$^f$ | — | 100 | — | 47 ± 3 | 648 ± 24 |
| 12 | pDLACL70/30$^f$ | PLLA$^c$ | 95 | 05 | 48 ± 4 | 604 ± 73 |
| 13 | pDLACL 75/25$^g$ | — | 100 | — | 123 ± 4 | 504 ± 77 |
| 14 | pDLACL 75/25$^g$ | PLLA$^c$ | 95 | 05 | 140 ± 5 | 549 ± 34 |
| 15 | pDLACL 75/25$^g$ | pLLACL$^h$ | 50 | 50 | 36 ± 3 | 699 ± 42 |

$^a$) ± denotes standard deviation;
$^b$) LA/CL = 75/25 w/w and DR = 6.3:1;
$^c$) $M_w$ = 16 KDa;
$^d$) LA/CL = 67/33 w/w and DR = 3.0:1;
$^e$) LA/CL = 71/29 w/w and DR = 3.3:1;
$^f$) LA/CL = 70/30 w/w and DR = 3.4:1;
$^g$) LA/CL = 75/25 w/w and DR = 5.0:1;
$^h$) LA/CL = 71/29 w/w and DR = 2.7:1.

The films with 5 to 20 wt % of component (B) showed a good shape stability after deformation as can be seen in FIG. 4 showing that the film of Example 8 after stretching to about twice of its initial length returned perfectly to its initial length.

Wide angle x-ray scattering (WAXS) measurements were conducted on the films in order to determine the total crystallinity and to prove the presence of crystallites originating from stereocomplexes between oligo-LLA sequences of one polymer component and the oligo-DLA sequences of the second polymer component. FIG. 5 shows the WAXS-spectra of a film of Example 7 and for comparison of a film of the corresponding pure copolymer (A2). The additional signals at 2θ=12° and 21° of the blend confirm the presence of stereocomplexes between the oligo(L-lactide) sequences of P(LLA-co-CL) and PDLA in the blend. The total crystallinity ($X_c$) of both films was 26%.

Preparation of Porous Flat Patches by Electrospinning

The basic setup of an electrospinning apparatus 10 is depicted in FIG. 6. The Apparatus 10 comprises a syringe 11 equipped with needle 12 for storing a solution of the polymer blend 3. A collector 13 is positioned below the syringe 11. The collector 13 may be a flat plate (as shown here), a rotating drum or a more complex three-dimensional rotating element. The needle 12 is applied with a voltage V and the collector 13 is grounded. A plunger of the needle can be moved downwards by an electric motor (not shown). Alternatively, the reservoir for the solution 3 may be equipped with a pump.

A solution of a polymer blend of 95:5 w/w of P(LLA-co-CL) 67/33 and PDLA-16k in hexafluoro isopropanol was prepared and subjected to electrospinning by using an aluminum mandrel (Ø=10 cm) covered with polypropylene foil as collector to obtain flat patches. The spinning parameters are summarized in Table 3. The parameters were chosen based on the experience obtained by electrospinning various other polymers and may be varied depending on the desired fiber morphology.

TABLE 3

Parameters for electrospinning a solution of [95:5 w/w P(LLA-co-CL) 67/33 + PDLA-16K] into nonwoven fiber patches.

| solvent | C | V | D | V | H | mandrel diameter (rotation speed) |
|---|---|---|---|---|---|---|
| HFIP | 8% w/v | 15-21 kV | 30 cm | 2.12 mL/h | <10% | 10 cm (10 rpm) |

C: concentration;
V: voltage;
D: distance between needle and collector;
V: flow rate;
H: relative humidity The patches were investigated by scanning electron microscopy (SEM) as shown in FIG. 7 by way of a representative image. The average fiber diameter was 1.8±0.3 μm as determined from the SEM images. As can be seen from FIG. 7, the electrospun fibers are interconnected and give rise to a highly porous, non-woven fibrous structure.

The obtained electrospun patches were characterized by DSC, WAXS, dynamic thermal mechanical analysis (DMTA) as well as tensile testing (data summarized in Table 4).

The electrospun patches show similar thermal properties to the solution-casted films confirming the presence of stereocomplexes that serve as nucleation agents to form physical netpoints ensuring long-term form stability in a wide temperature range and under physiological conditions. The WAXS diffraction pattern of the [95:5 w/w P(LLA-co-CL) 67/33+PDLA-16k]electrospun fibres is depicted in FIG.

8. The specific signal at 2θ=12° confirms the presence of stereocomplexes between the oligo(L-lactide) sequences of P(LLA-co-CL) and PDLA (compare FIG. 5).

TABLE 4

Thermal and mechanical properties of electrospun patches made of [95:5 w/w P(LLA-co-CL) 67/33 + PDLA-16k].

| $T_m$ [° C.][a] | $T_g$ [° C.][a] | $T_g$ at max E″/tan δ [° C.][b] | E-modulus [MPa][c] | $\sigma_{max}$ [MPa] | $\varepsilon_b$ [%] |
|---|---|---|---|---|---|
| 46, 128, 194 (178) | −9 (−5) | −6/+1 | 3.7 ± 0.6 | 2.3 ± 0.2 | 600 ± 50 |

[a]Values determined by DSC in the 1st heating cycle; thermal transitions in brackets correspond to 2nd heating cycle;
[b]determined by DMTA; E″: loss modulus, tan δ; E′/E″ (E′: storage modulus);
[c]calculation of E-modulus between 0.05% and 0.25% elongation.

Most importantly, the electrospun materials are fairly soft and highly elastic, which is reflected by an E-modulus in the low MPa range, which is significantly lower than that of the same polymer processed into a non-porous film. The high $\varepsilon_b$ value of about 600% without a yield point, enables full elastic recovery after removal of the stress as a further characteristic of the produced material. A typical stress/strain diagram obtained by tensile testing is depicted in FIG. 9.

The high form stability of the electrospun material was demonstrated by the data derived from cyclic tensile testing after applying different ratios of pre-stain in the range of 0 to 300% followed by three cycles. FIG. 10 shows the corresponding stress/strain diagrams. The data determined are summarized Table 5. The high recovery rates of more than 90% indicate the high from stability.

TABLE 5

Mechanical properties (tensile test; 3 cycles) of electrospun [95:5 w/w P(LLA-co-CL) 67/33 + PDLA-16k].

| Pre-strain for cycles (%) | E-modulus (MPa) | | | | Recovery ratio (%) | | | Failure stress (MPa) | Elongation at break (MPa) | |
|---|---|---|---|---|---|---|---|---|---|---|
| | 1st cycle | 2nd cycle | 3th cycle | 4th | 1st cycle | 2nd cycle | 3th cycle | | | |
| 0 | 0.7 | — | — | — | — | — | — | 4.7 | 432[a] | |
| 50 | 0.8 | 0.9 | 1.0 | 0.9 | 79 | 93 | 90 | 5.2 | 437[a] | 370[b] |
| 100 | 0.9 | 0.9 | 0.9 | 0.9 | 85 | 97 | 99 | 7.9 | 623[a] | 522[b] |
| 150 | 0.8 | 1.0 | 1.0 | 1.0 | 77 | 95 | 96 | 5.2 | 511[a] | 352[b] |
| 200 | 0.9 | 0.9 | 1.0 | 1.0 | 80 | 95 | 97 | 6.9 | 548[a] | 359[b] |
| 300 | 0.7 | 0.7 | 0.7 | 0.7 | 71 | 92 | 95 | 3.4 | 391[a] | 182[b] |

The E-modulus was calculated from between strain of 1-5% (from the second cycle, strain needs to be calculated based on the previous length of samples);
[a]: the elongation at break = total strain;
[b]: re-calculation of the elongation at break based on the previous length of samples.

Preparation of Porous Tubes by Electrospinning

Electrospinning was also performed on a smaller aluminum mandrel (Ø=20 mm, 120 mm length). The electrospinning parameters are summarized in Table 6. Electrospun [95:5 w/w P(LLA-co-CL) 67/33+PDLA-16k] tubes with a thickness of 310-330 μm (electrospinning for 7.2 h) were obtained.

TABLE 6

Parameters for electrospun tubes made of [95:5 w/w P(LLA-co-CL) 67/33 + PDLA-16k].

| solvent | C | V | D | V | H | mandrel diameter (rotation speed) |
|---|---|---|---|---|---|---|
| HFIP | 8% w/v | 21-23 kV | 30 cm | 3.54 mL/h | <10% | 20 mm (10 rpm) |

C: concentration;
V: voltage;
D: distance between needle and collector;
V: flow rate;
H: relative humidity After removal from the mandrel (rolling), the tubes preserved their shape upon storage. Shrinkage of the tube dimeter due to entropic relaxation of the polymeric fibers was found to be very little (around 3%). Just like the electrospun patches, the tube displays and E-modulus and $\sigma_{max}$ values of a few MPa and are highly elastic ($\varepsilon_b$=600%).

The invention claimed is:

1. A polymer blend, comprising or consisting of:
   (A) a first polymer component, being a copolymer which is poly[(L-lactide)-co-(ε-caprolactone)] or poly[(D-lactide)-co-(εcaprolactone)], wherein the first polymer component (A) has a substantially random, partially blocky structure expressed by a dyad ratio of lactide-lactide dyads (LA-LA) to lactide-ε-caprolactone dyads (LA-CL) of at least 2.5:1; and
   (B) a second polymer component different from the first polymer component (A) selected from poly(L-lactide), poly(D-lactide), poly[(L-lactide)-co-(ε-caprolactone)] and poly[(D-lactide)-co-(ε-caprolactone)],
   wherein the first and second polymer components (A) and (B) are selected such that the resulting polymer blend comprises a combination of constitution units derived from L-lactide and constitution units derived from D-lactide.

2. The polymer blend according to claim 1, comprising or consisting of 80 to 99 wt % of the first polymer component (A) and 1 to 20 wt % of the second polymer component (B) selected from poly(L-lactide) or poly(D-lactide).

3. The polymer blend according to claim 1, wherein poly[(L-lactide)-co-(ε-caprolactone)] or poly[(D-lactide)-co-(ε-caprolactone)] has a weight average molecular weight $M_w$ of at least 80 kDa, as determined by universally calibrated gel permeation chromatography.

4. The polymer blend according to claim 1, wherein poly(L-lactide) or poly(D-lactide) has a weight average molecular weight $M_w$ in the range of 1 to 40 kDa, as determined by universally calibrated gel permeation chromatography.

5. The polymer blend according to claim 1, wherein a weight content of e-caprolactone in the first polymer component (A) is in the range of 25 to 47 wt %, based on the total weight of the copolymer (A).

6. The polymer blend according to claim 1, wherein a fraction of e-caprolactone present in an amorphous phase in the first polymer component (A) is at least 25 mol %, based on the total molar amount of e-caprolactone in the first polymer component (A), as determined by NMR and DSC measurements.

7. The polymer blend according to claim 1, selected from:
a blend comprising poly[(L-lactide)-co-(e-caprolactone)] and poly(D-lactide);
a blend comprising poly[(D-lactide)-co-(e-caprolactone)] and poly(L-lactide); and
a blend comprising poly[(L-lactide)-co-(e-caprolactone)] and poly[(D-lactide)-co-(e-caprolactone)].

8. The polymer blend according to claim 1, wherein the polymer blend has an elongation at break in the range of 400 to 1000% at 25° C., as determined by uniaxial tensile testing.

9. The polymer blend according to claim 1, wherein the polymer blend has an elastic modulus in the range of 25 to 150 MPa at 25° C., as determined by uniaxial tensile testing.

10. An object prepared from a polymer blend according to claim 1, the object having a porous, non-woven fibrous structure.

11. The object according to claim 10, wherein the fibers have an average fiber diameter in the range of 0.5 to 10 μm, as determined from SEM images.

12. The object according to claim 10, wherein the object has an elongation at break at 25° C. in the range of 250 to 850%, as determined by tensile testing.

13. The object according to claim 10, wherein the object has an elastic modulus at 25° C. in the range of 0.3 to 5 MPa, as determined by tensile testing.

14. A method of processing a polymer blend, comprising:
providing a solution of a polymer blend in a solvent, the polymer blend comprising or consisting of: (A) a first polymer component, being a copolymer having a substantially random, partially blocky structure and selected from poly[(L-lactide)-co-(e-caprolactone)] and poly[(-lactide)-co-(e-caprolactone)], wherein the first polymer component (A) has a dyad ratio of lactide-lactide dyads (LA-LA) to lactide-e-caprolactone dyads (LA-CL) of at least 2.5:1; and (B) a second polymer component different from the first polymer component (A) selected from poly(L-lactide), poly(D-lactide), poly[(L-lactide)-co-(e-caprolactone)] and poly[(D-lactide)-co-(e-caprolactone)], wherein the first and second polymer components (A) and (B) are selected such that the resulting polymer blend comprises a combination of constitution units derived from L-lactide and constitution units derived from D-lactide;
subjecting the solution to electrospinning to produce fibers of the polymer blend; and
depositing the fibers to form a non-woven fibrous structure building-up the object.

15. A method of producing an object having a porous, non-woven fibrous structure, comprising:
providing a solution of a polymer blend in a solvent, the polymer blend comprising or consisting of: (A) a first polymer component, being a copolymer having a substantially random, partially blocky structure and selected from poly[(L-lactide)-co-(e-caprolactone)] and poly[(D-lactide)-co-(e-caprolactone)], wherein the first polymer component (A) has a dyad ratio of lactide-lactide dyads (LA-LA) to lactide-e-caprolactone dyads (LA-CL) of at least 2.5:1; and (B) a second polymer component different from the first polymer component (A) selected from poly(L-lactide), poly(D-lactide), poly[(L-lactide)-co-(e-caprolactone)] and poly[(D-lactide)-co-(e-caprolactone)], wherein the first and second polymer components (A) and (B) are selected such that the resulting polymer blend comprises a combination of constitution units derived from L-lactide and constitution units derived from D-lactide;
subjecting the solution to electrospinning to produce fibers of the polymer blend; and
depositing the fibers to form a non-woven fibrous structure building-up the object.

16. The polymer blend according to claim 1, comprising or consisting of 50 to 95 wt % of the first polymer component (A) and 5 to 50 wt % of the second polymer component (B) selected from poly[(L-lactide)-co-(e-caprolactone)] or poly[(D-lactide)-co-(e-caprolactone)].

* * * * *